United States Patent
Mercando et al.

(10) Patent No.: US 7,910,628 B2
(45) Date of Patent: Mar. 22, 2011

(54) ACID-BASED POLYMERIC DISPERSANTS WITH 2-[2-(2-METHOXYETHOXY)ETHOXY]ACETIC ACID

(75) Inventors: Lisa Ann Mercando, Pennsburg, PA (US); Jeffrey Raymond Quay, Kutztown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/099,438

(22) Filed: Apr. 8, 2008

(65) Prior Publication Data

US 2008/0269356 A1 Oct. 30, 2008

Related U.S. Application Data

(60) Provisional application No. 60/913,852, filed on Apr. 25, 2007.

(51) Int. Cl.
*B01F 3/12* (2006.01)

(52) U.S. Cl. ............... 516/31; 428/404; 523/204
(58) Field of Classification Search ............... 516/31
See application file for complete search history.

(56) References Cited

U.S. PATENT DOCUMENTS

| 7,081,234 B1 | 7/2006 | Qi et al. | |
|---|---|---|---|
| 2003/0032679 A1 | 2/2003 | Cayton et al. | |
| 2006/0204745 A1* | 9/2006 | Jones et al. | 428/328 |
| 2007/0077411 A1* | 4/2007 | Hatta et al. | 428/323 |
| 2007/0098990 A1* | 5/2007 | Cook et al. | 428/404 |

OTHER PUBLICATIONS

"Ito, Tin-Doped Indium Oxide for Optical Coating" Swati et al., J. Appl. Phys. 54(6), 3497, 1983.*

* cited by examiner

*Primary Examiner* — Ling-Siu Choi
*Assistant Examiner* — Chun-Cheng Wang
(74) *Attorney, Agent, or Firm* — Michael K. Boyer

(57) ABSTRACT

The disclosure relates to acid-based polymeric dispersants containing 2-[2-(2-methoxyethoxy)ethoxy]acetic acid for dispersing metal oxide nanoparticles in organic solvents such as methyl ethyl ketone (MEK) and butyl acetate.

21 Claims, No Drawings

ACID-BASED POLYMERIC DISPERSANTS WITH 2-[2-(2-METHOXYETHOXY)ETHOXY]ACETIC ACID

This Application claims the benefit of Provisional Patent Application No. 60/913,852, filed on Apr. 25, 2007. The disclosure of this Application is hereby incorporated by reference.

BACKGROUND OF THE INVENTION

This invention relates to dispersants or dispersing agents and particulate dispersions including nanoparticle dispersions.

Nanoparticles of metal oxides and metal borides, specifically, those of zinc, zirconium, cerium, titanium, aluminum, lanthanum, indium and tin have important commercial applications. Nano zirconia, ceria and alumina are of interest for scratch resistant coatings and heat transfer fluids. Additionally, aluminum metal nanoparticles that have been passivated with a thin layer of aluminum oxide are of use in the development of energetic materials. Indium tin oxide (ITO) nanoparticles have applications in clear conductive coatings, in heat management layers, and in static charge dissipation. Zinc oxide and titania (TiO2) are of interest for UV blocking applications, including sunscreens, clothing and coatings. Other applications of metal oxide nanoparticles and/or nanoparticles that have a metal oxide surface include magnetic materials, heterogeneous catalysts, toner compositions, and ceramics.

In order to supply nanoparticles and/or microparticles for expedient use as dispersions for master batches or in fully formulated compositions, the particles must be dispersed in various liquids and polymeric matrices. The quality of the dispersion should be commensurate with its intended use. For example, the presence of color or haze is unacceptable in many applications, including inks and coatings. In addition, the dispersion is preferably stable so it does not have to be prepared immediately before use, but can be stored after preparation.

US Patent Application Publication No. 2003/0032679 describes the dispersion of nanoparticles in solvents using commercially available dispersants; the disclosure of which is hereby incorporated by reference.

BRIEF SUMMARY OF THE INVENTION

The instant invention solves problems associated with conventional dispersions by treating particulate surfaces with a dispersant comprising 2-[2-(2-methoxyethoxy)ethoxy]acetic acid and derivatives thereof, and at least one acidic polymeric dispersant. These two types of dispersants result in a stable and clear dispersion when combined with organic solvents. In addition, this stable dispersion can be prepared into a formulation that yields dried films with very good clarity.

The invention relates to a composition for surface treating metal or metal oxide particles (e.g., nanoparticles). The composition comprises:
i) about 1:10 to about 5:1 ratio of at least one surface treating agent 2-[2-(2-methoxyethoxy)ethoxy]acetic acid to nanoparticle based on weight; and,
ii) about 1:10 to about 5:1 of at least one acid functional polymeric dispersant to nanoparticle based on weight.

DETAILED DESCRIPTION OF THE INVENTION

The invention relates to a composition for surface treating metal or metal oxide particles (e.g., nanoparticles) which can be combined with at least one solvent in order to obtain a particulate dispersion. The dispersion can in turn be combined with or incorporated in other materials to produce a formulated or end-use product. The composition comprises:
i) about 1:10 to about 5:1 ratio of at least one surface treating agent 2-[2-(2-methoxyethoxy)ethoxy]acetic acid to nanoparticle based on weight; and,
ii) about 1:10 to about 5:1 of at least one acid functional polymeric dispersant to nanoparticle based on weight.

While any suitable acid functional polymeric dispersants can be employed, examples of suitable polymeric dispersants comprise at least one member selected from the group consisting of saturated phosphate polyester or copolymer with acidic groups (e.g., Disperbyk® 110, Disperbyk® 111), solutions of high molecular block copolymers with pigment affinic groups (e.g., Disperbyk® 174), among other acid functional polymeric compounds. In one aspect of the invention, at least one fatty acid derivative of an acid functional polymeric dispersant is used instead of or in conjunction with other acid functional dispersants (e.g., Tego® 652).

While any suitable solvent or combinations thereof can be employed, examples of such solvents comprise at least one member selected from the group consisting of methyl ethyl ketone, toluene, butyl cellosolve acetate (2-butoxyethyl acetate) and butyl acetate.

The inventive dispersions are typically incorporated within or combined with other materials in order to produce an end-use or formulated product. The amount of dispersion in the formulated product can range from about 0.1 wt % to about 80 wt % of the formulated product. The inventive dispersion can be added during any step of the formulation of the coating system.

The inventive dispersion can be incorporated for use within a wide range of formulated products. Examples of such formulated products comprise adhesives, coatings, composites, laminates, among other products.

The end use for these dispersions are for relatively transparent and low haze coatings, binders and surface treatments containing metal and metal oxide nanoparticles in organic solvents.

In one aspect of the invention, the inventive dispersion is added to a formulated product comprising a coating. The coating can be employed to impart a wide range of properties to the underlying substrate. In one aspect of the invention, the coating is applied onto a substrate comprising at least one of glass and plastic. The coating can impart improved solar control, anti-static, electrical conductivity, among other properties. For example, an inventive dispersion comprising ITO particles and butyl acetate (e.g., Example 2 infra) can be employed for providing solar control for window films.

The following Examples are provided in order to illustrate certain aspects of the invention and shall not limit the scope of any claims appended hereto.

EXAMPLE 1

2 g of (2-(2-butoxyethoxy)ethyl acetate (BCA) and 5 g of 2-[2-(2-methoxyethoxy)ethoxy]acetic acid were diluted in 70 g of butyl acetate. 25 g of indium tin oxide nanopowder was added slowly while stirring. The mixture was ultrasonicated for 1 hour and then run through a Netzsch mill at between 2500-4200 rpm for 1-3 hours. The grinding media in the mill was yttria-doped zirconia 0.1 mm size. This mixture was not stable and settled in 1 hour, even though the initial particles size Z average was between 30-70 nm.

EXAMPLE 2

Same procedure as Example 1, except an acid-functional polymeric dispersant was added to the mixture immediately after milling. In butyl acetate, the amount of the acid functional polymeric dispersant is >10 wt %, based upon ITO solids (e.g., 20 wt % acid functional polymeric dispersant, based upon ITO solids). Particle size Z average was between 30-60 nm. Product is a dark blue dispersion which exhibits little or no settling of the ITO.

EXAMPLE 3

10 g of Disperbyk 110 was added to butyl acetate and indium tin oxide nanopowder was added slowly while stirring. The mixture was ultrasonicated for a few minutes. The mixture began to rapidly rise in viscosity and the dispersion process was halted. The dispersion was not stable.

EXAMPLE 4

Post addition of base-functional polymeric dispersants (e.g., Byk® 9077 a polyester based copolymer; Disperbyk® 2150; Disperbyk® 190; Disperbyk® 192; Disperbyk® 181; Disperbyk® 180; Disperbyk® 161; and Disperbyk® 183) to the dispersion from Example 1 resulted either in an unstable dispersion immediately or a dispersion that settled/destabilized within a few days.

EXAMPLE 5

Same procedure as Example 1, except the acid-functional polymeric dispersant was added along with the 2-[2-(2-methoxyethoxy)ethoxy]acetic acid into the solvent. Particle size Z average was between 30-60 nm. Product is a dark blue dispersion which exhibits little or no settling of the ITO.

EXAMPLE 6

Same procedure as Example 2, except in the absence of (2-2-butoxyethoxy)ethyl acetate (BCA). Particle size Z average was between 30-60 nm. Product is a dark blue dispersion which exhibits little or no settling of the ITO.

EXAMPLE 7

3.6 g of 2-[2-(2-methoxyethoxy)ethoxy]acetic acid was diluted in 70 g of butyl acetate. 25 g of indium tin oxide nanopowder was added slowly while stirring. The mixture was mixed using a "Rotostater" (Ultra-Turrax, IKA Labotechnik, Model #SD45) covering the side holes with the liquid level for 15 min on the 60 dial speed. The mixture was then run through a Netzsch mill at 2500 rpm for 1 hour and then at 4200 rpm for an additional hour. The grinding media in the mill was yttria-doped zirconia 0.1 mm size. 0.93 g of disperbyk 110 and 5.5 g of (2-(2-butoxyethoxy)ethyl acetate (BCA) was then added while stirring. Particle size Z average was between 50-80 nm. Product is a dark blue dispersion which exhibits little or no settling of the ITO.

EXAMPLE 8

4 g of 2-[2-(2-methoxyethoxy)ethoxy]acetic acid was diluted in 72 g of toluene (or methyl ethyl ketone can be used as the solvent instead). 25 g of lanthanum hexaboride nanopowder was added slowly while stirring. The mixture was mixed using a "Rotostater" (Ultra-Turrax, IKA Labotechnik, Model #SD45) covering the side holes with the liquid level for 15 min on the 60 dial speed. 2 g of disperbyk 110 and 2 g of (2-(2-butoxyethoxy)ethyl acetate (BCA) was then added while stirring. The mixture was then run through a Netzsch mill at 2500-4200 rpm for 3 hours. The grinding media in the mill was yttria-doped zirconia 0.1 mm size. Particle size Z average was between 500-1000 nm. Product is a dark purple dispersion which exhibits little or no settling of the lathnaum hexaboride.

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

The invention claimed is:

1. A composition comprising:
   (i) nanoparticles comprising indium tin oxide
   (ii) about 1:10 to about 5:1 ratio of at least one surface treating agent 2-[2-(2-methoxyethoxy)ethoxy]acetic acid to nanoparticle based on weight;
   (iii) about 1:10 to about 5:1 of at least one acid functional polymeric dispersant to nanoparticle based on weight; and,
   iv) at least one organic solvent.

2. The composition of claim 1 wherein said organic solvent comprises at least one of (2-(2-butoxyethoxy)ethyl acetate and butyl acetate.

3. The composition of claim 1 wherein said organic solvent comprises at least one of methyl ethyl ketone, toluene, butyl cellosolve acetate and butyl acetate.

4. The composition of claim 1 wherein the at least one acid functional polymeric dispersant comprises at least one member selected from the group consisting of saturated phosphate polyester and copolymer with acidic groups.

5. A dispersion comprising:
   i) about 1:10 to about 5:1 ratio of at least one surface treating agent 2-[2-(2-methoxyethoxy)ethoxy]acetic acid to nanoparticle based on weight;
   ii) about 1:10 to about 5:1 of at least one acid functional polymeric dispersant to nanoparticle based on weight; wherein the at least one acid functional polymeric dispersant comprises at least one member selected from the group consisting of saturated phosphate polyester and copolymer with acidic groups;
   iii) nanoparticles comprising at least one member selected from the group consisting of borides, zirconia, ceria, indium tin oxide, zinc oxide and titania; and,
   iv) at least one solvent; wherein the amount of dispersant is sufficient to reduce settling of the nanoparticles.

6. The dispersion of claim 5 wherein the metal oxide nanoparticles comprise indium tin oxide nanoparticles.

7. The dispersion of claim 6 wherein the solvent comprises at least one of methyl ethyl ketone, toluene, butyl cellosolve acetate and butyl acetate.

8. A dispersion comprising:
   i) 2-[2-(2-methoxyethoxy)ethoxy]acetic acid;
   ii) at least one acid functional polymeric dispersant;
   iii) at least one organic carrier, and;
   iii) nanoparticles comprising indium tin oxide; wherein the amount of acid is sufficient to form a dispersion and the amount of dispersant is sufficient to reduce settling of the nanoparticles.

9. The dispersion of claim 5 wherein the nanoparticles comprise at least one boride.

10. The dispersion of claim 9 wherein the boride comprises lanthanum hexaboride.

11. The dispersion of claim 5 further comprising at least one fatty acid derivative of the acid functional polymeric dispersant.

12. A composition of matter comprising about 0.1 to about 80 wt. % of the dispersion of claim 5.

13. The composition of matter of claim 12 wherein said composition comprises at least one member selected from the group consisting of adhesives, coatings, composites and laminates.

14. The composition of claim 5 wherein the solvent comprises (2-(2-butoxyethoxy)ethyl acetate.

15. The dispersion of claim 5 wherein the nanoparticles comprise indium tin oxide and the particle size Z average is between 30 to 60 nm.

16. The dispersion of claim 5 wherein the nanoparticles comprise lanthanum hexaboride and the particle size Z average is between 500 to 1000 nm.

17. The dispersion of claim 8 wherein the solvent comprises butyl acetate.

18. The dispersion of claim 5 wherein the nanoparticles comprise zirconia.

19. The dispersion of claim 5 wherein the nanoparticles comprise ceria.

20. The dispersion of claim 5 wherein the nanoparticles comprise zinc oxide.

21. The dispersion of claim 5 wherein the nanoparticles comprise titania.

* * * * *